UNITED STATES PATENT OFFICE.

ERIK LUDVIG RINMAN, OF STOCKHOLM, SWEDEN.

PROCESS OF TREATING THE WASTE LIQUOR FROM THE SULFITE-CELLULOSE MANUFACTURE.

1,202,317.      Specification of Letters Patent.      Patented Oct. 24, 1916.

No Drawing.      Application filed February 18, 1915. Serial No. 9,167.

*To all whom it may concern:*

Be it known that I, ERIK LUDVIG RINMAN, a subject of the King of Sweden, residing at Stockholm, in the Kingdom of Sweden, have invented new and useful Improvements in Processes of Treating the Waste Liquor from the Sulfite-Cellulose Manufacture, of which the following is a specification.

It is known that by boiling the waste liquor from the sulfite cellulose manufacture with alkalis, for instance with hydrate of lime, some of the sulfurous organic matters will be decomposed into sulfurous acid, which is precipitated as calcium sulfite, and insoluble organic matters. The insoluble matters comprising the so called lignin substances, which are obtained as a precipitate together with the calcium sulfite, may be separated and utilized either directly as fuel, or the calcium sulfite may be dissolved with sulfurous acid whereupon the lignin substance separated from the solution may be utilized as fuel or for other purposes.

In contrast hereto my present invention has for its object to treat the waste liquor from the sulfite cellulose manufacture, either in its unchanged state or after one or more of its constituents, for instance fermentable sugar and part of the sulfurous acid, have been separated from the same by means of known processes not forming a part of this invention, by boiling the same under pressure with such an excess of alkalis that the waste liquor after boiling remains alkaline, and during so long time that the organic matters not precipitated are transformed into such organic acids which by dry distillation with strong bases, especially in the presence of a sufficient quantity of preferably superheated steam, give alcohols, ketones, aldehydes, and hydrocarbons, especially acetone and spirit. This is most suitably done in such manner that the boiling of the waste liquor from the sulfite cellulose manufacture is performed under pressure with hydrate of lime. The waste liquor may be concentrated (most suitably after neutralizing and filtering), as its capacity of dissolving the hydrate of lime will thus be increased. The boiling is preferably made with such excess of hydrate of lime, as the waste liquor can retain in solution after the boiling, care being taken that the temperature is kept rather low at the beginning and afterward increased, although a rise above 180° to 190° C. should not be necessary.

The value of the products obtained is greatly increased by adding vegetable matters such as sawdust, bark cuttings, and the like, to the waste liquor which is to be boiled with hydrate of lime. Provided that hydrate of lime be present in a sufficient quantity, such substances are dissolved from the organic matters when boiling which are transformed into acids soluble in water, while lignin and cellulose substances remain undissolved. Such organic lime salts are hereby obtained in the solution which by dry distillation with hydrate of lime especially in the presence of preferably superheated steam give alcohols, aldehydes, ketones, and hydrocarbons, especially acetone and spirit, while calcium sulfite, lignin and other vegetable substances are obtained as precipitates. The above-mentioned addition of vegetable matters may take place either before beginning the boiling or after precipitating the lignin substance or even after separating the same. When the boiling is finished the solution is separated from the precipitate and is utilized by dry distillation with hydrate of lime. The precipitate is used either directly as fuel or the calcium sulfite may first be dissolved with sulfurous acid and the undissolved part then used as fuel.

The solution of lime salts obtained may suitably be concentrated and the quantity of lime necessary for the dry distillation then added to the same, 1 to 2, or preferably 1½ molecules per molecule lime combined in the salts. If the lime is added as oxid care should be taken that the same is slaked before the dry distillation. It is preferred first to evaporate the lye to 30 to 40 degrees Baumé (sp. gr. 1,26 to 1,38) and then add the lime so that the same will be slaked, whereupon the thick solution thus obtained (if desired after straining) is either directly injected into furnaces for continuous dry distillation of liquids, or bodies suspended in liquids, or the thick solution is evaporated to dryness, for instance on ordinary drying cylinders, and the dry mass thus obtained then dry distilled in the presence of a sufficient quantity of superheated steam, for instance in ordinary stills for acetone manufacture or, preferably, in screw conveyers heated from the outside, especially as the reaction requires a slow increase of the temperature from about 300° C. to about 500° C.

At the dry distillation of the lime salts described above no mercaptans are formed, provided that the boiling with hydrate of lime has been carried out during sufficiently long time and at a sufficiently high temperature. If the dry distillation has been carried out in the presence of a sufficient quantity of superheated steam, the distillate obtained consists of alcohols, aldehydes, ketones, and hydrocarbons, especially acetone, wood spirit, common alcohol, and oils consisting of higher alcohols, aldehydes, ketones, and hydrocarbons, and ammonia and other nitrogenous compounds. At the dry distillation there is also formed a residue containing calcium carbonate, other compounds of calcium in small quantities, and carbon. This residue, having a temperature of about 500° C., is preferably burnt directly by admitting air, when the lime is regenerated to oxid without necessitating fuel to be added. The air supply should be abundant so that the oxid produced will not be fouled by calcium sulfite but can be used again for the process. The heat generated by this combustion may suitably be used for the dry distillation.

The precipitate obtained, particularly the precipitate which in the described manner has been freed from calcium sulfite may with advantage be made into briquets. These briquets may be coked when a coke is obtained which makes an excellent substitute for charcoal. The lignin substance present acts as adhesive when briquetting. Other vegetable matters may then also be added.

The turpentine, wood-spirit, ammonia, and resins formed when boiling are, of course, utilized according to known processes. The waste liquor used for this purpose may be freed from such sulfurous acid that can be separated, before the boiling with hydrate of lime takes place. The fermentable sugar may also be separated from the waste liquor by means of fermentation before the boiling, as also any other substances in the waste liquor which are desired to be used for other purposes may be separated from the same. It is evident that if great quantities of sawdust, wood-cuttings and the like are at disposal, the same quantity of waste liquor may be boiled several times with new quantities of cuttings which will allow the boiling of the waste liquor to take place at a higher degree of concentration than would otherwise be possible.

The following example may be given of how this process of treating the waste liquor from the sulphite cellulose manufacture is applied when no additional vegetable matters are added: The waste liquor is first freed by means of suitable known apparatus from the free sulfurous acid. The waste liquor is then evaporated to about 16° to 18° Baumé after which while the liquor is still hot (about 90° cent.) a lime-wash consisting of about one part CaO per two or three parts water, is added to the liquor in such quantity that on each cubic meter liquor come about 25 kg. CaO. The mixture is then introduced into an ordinary iron cellulose boiler capable of sustaining a pressure of 10 atm. and which may either be rotary or provided with a "stirrer". In the boiler the waste liquor is first boiled during one or two hours at a temperature of up to 150° cent., after which the temperature is increased to 180° cent. (10 atm.) during about two to three hours, when the boiling is completed. The boiler then contains a fine-grained precipitate of lignin and calcium sulfite, which is easily strained, and a solution of organic calcium salts, chiefly salts of oxyacids. The pressure having been removed, the precipitate is separated from the solution by means of an ordinary filter-press, after which the wet precipitate is treated for instance in a stirring-vessel with a solution of sulfurous acid containing enough sulfurous acid for dissolving the calcium sulfite. When the calcium sulfite has become dissolved, the calcium hyposulfite formed is separated from the precipitate of lignin substance in a wooden filter-press. The solution of calcium hyposulfite may be used directly as boiling acid for boiling new quantities of wood for sulphite cellulose manufacture. When freed from water the precipitate of lignin substance may be used as fuel, for instance added to coal. The alkaline solution first obtained is then evaporated to about 40° Baumé after which lime-wash is added to the same in such manner that on one molecule CaO chemically bound come 1½ mol. CaO as hydrate of lime. This mixture of lime-wash and waste liquor is then evaporated, for instance on an ordinary drying cylinder, to a dry mass which is then subjected to dry distillation, for instance in an ordinary acetone retort, in the presence of superheated steam when a distillate is obtained consisting mainly of acetone, wood spirit, and oils, which are taken care of according to known methods. By burning the residue of the dry distillation the lime in the same may be recovered as calcium oxid, which may be used again in the manufacture.

I claim:

1. The process of treating the waste liquor from the sulfite cellulose manufacture, consisting in boiling the waste liquor with an excess of alkalies under pressure for such a time that the constituents of the waste liquor are transformed into a precipitate of lignin and calcium sulfite and a solution of organic salts, separating said solution of salts from said precipitate, and subjecting said salts to dry distillation with strong bases, particularly hydrate of lime, in the presence of preferably superheated steam.

2. The process of treating the waste liquor from the sulfite cellulose manufacture, consisting in boiling the waste liquor with an excess of hydrate of lime under pressure for such a time that the constituents of the waste liquor are transformed into a precipitate of lignin and calcium sulfite and a solution of organic calcium salts, separating said solution of salts from said precipitate, and subjecting said calcium salts to dry distillation with strong bases, particularly hydrate of lime, in the presence of preferably superheated steam.

3. The process of treating the waste liquor from the sulfite cellulose manufacture, consisting in separating fermentable substances from the liquor and boiling the remainder of the waste liquor with an excess of alkalis under pressure for such a time that the constituents of the waste liquor are transformed into a precipitate of lignin and calcium sulfite and a solution of organic salts, separating said solution of salts from said precipitate, and subjecting said salts to dry distillation with strong bases, particularly hydrate of lime, in the presence of preferably superheated steam.

4. The process of treating the waste liquor from the sulfite cellulose manufacture, consisting in separating fermentable substances from the liquor and boiling the remainder of the waste liquor with an excess of hydrate of lime under pressure for such a time that the constituents of the waste liquor are transformed into a precipitate of lignin and calcium sulfite and a solution of organic calcium salts, separating said solution of salts from said precipitate, and subjecting said calcium salts to dry distillation with strong bases, particularly hydrate of lime, in the presence of preferably superheated steam.

5. The process of treating the waste liquor from the sulfite cellulose manufacture, consisting in adding vegetable matters to the liquor and boiling the mixture with an excess of alkalis under pressure for such a time that the constituents of the waste liquor and some of the constituents of the vegetable matters are transformed into a mixture of organic matters and a precipitate of lignin and calcium sulfite and a solution of organic salts, separating said solution of salts from said precipitate, and subjecting said salts to dry distillation with strong bases, particularly hydrate of lime, in the presence of preferably superheated steam.

6. The process of treating the waste liquor from the sulfite cellulose manufacture, consisting in separating fermentable substances from the liquor, adding vegetable matters to the liquor, boiling the mixture with an excess of alkalis under pressure for such a time that the constituents of the waste liquor and some of the constituents of the vegetable matters are transformed into a mixture of organic matters and a precipitate of lignin and calcium sulfite and a solution of organic salts, separating said solution of salts from said precipitate, and subjecting said salts to dry distillation with strong bases, particularly hydrate of lime, in the presence of preferably superheated steam.

ERIK LUDVIG RINMAN.

Witnesses:
   FREDRIK SCHUENTERLOW,
   ADOLF MOLIN.